(12) United States Patent
Xu et al.

(10) Patent No.: US 10,906,562 B2
(45) Date of Patent: Feb. 2, 2021

(54) MOVABLE SIDE WALL AND OPENING/CLOSING MECHANISM FOR RAILROAD BOXCARS

(71) Applicant: CRRC YANGTZE CO., LTD., Wuhan (CN)

(72) Inventors: Donghua Xu, Wuhan (CN); Qiangjun Jiang, Wuhan (CN); Haitao Liu, Wuhan (CN); Fengwei Liu, Wuhan (CN); Wenliang Liu, Wuhan (CN); Chuanfeng Jing, Wuhan (CN); Baolei Wang, Wuhan (CN); Jinfa Zhang, Wuhan (CN); Xunqi Zhang, Wuhan (CN); Huanyun Liu, Wuhan (CN)

(73) Assignee: CRRC YANGTZE CO., LTD., Wuhan (CN)

( * ) Notice: Subject to any disclaimer, the term of this patent is extended or adjusted under 35 U.S.C. 154(b) by 208 days.

(21) Appl. No.: 15/779,816

(22) PCT Filed: Nov. 2, 2016

(86) PCT No.: PCT/CN2016/104333
§ 371 (c)(1),
(2) Date: May 29, 2018

(87) PCT Pub. No.: WO2017/092542
PCT Pub. Date: Jun. 8, 2017

(65) Prior Publication Data
US 2018/0257673 A1 Sep. 13, 2018

(30) Foreign Application Priority Data
Dec. 1, 2015 (CN) .......................... 2015 1 0870672

(51) Int. Cl.
*B61D 17/08* (2006.01)
*B61D 19/00* (2006.01)
*B61D 17/04* (2006.01)

(52) U.S. Cl.
CPC .......... *B61D 17/08* (2013.01); *B61D 17/043* (2013.01); *B61D 19/001* (2013.01);
(Continued)

(58) Field of Classification Search
CPC ........ B61D 17/00; B61D 17/08; B61D 19/00; B61D 19/001; B61D 19/003; B61D 19/005; B61D 19/006; B61D 19/007
See application file for complete search history.

(56) References Cited

U.S. PATENT DOCUMENTS 3,587,477 A * 6/1971 Ferris ................... B61D 19/005
105/378
3,828,693 A * 8/1974 Kampmann ......... B61D 19/007
105/378
(Continued)

*Primary Examiner* — Robert J McCarry, Jr.
(74) *Attorney, Agent, or Firm* — Platinum Intellectual Property LLP

(57) ABSTRACT

A movable side wall and opening/closing mechanism for railroad boxcars, comprising a side wall assembly (1), an end-portion opening/closing mechanism (2), a hinged rod assembly (3), a lateral door central clamping device (4), a upper transmission shaft assembly (5), a lower transmission shaft assembly (6), a upper track assembly (7) and a lower track assembly (8); upon loading/unloading cargo, the movable side wall can be opened further, so as to allow multiple forklifts of any tonnage on the ground to load/unload cargo to/from any positions of a carriage; the hinged rod assembly (3) and the central clamping device (4) are provided to keep the movable side wall reliably closed in order to ensure security and self-locking during transportation.

2 Claims, 4 Drawing Sheets

(52) U.S. Cl.
CPC ......... *B61D 19/007* (2013.01); *B61D 19/009* (2013.01); *Y02T 30/00* (2013.01)

(56) References Cited

U.S. PATENT DOCUMENTS

| | | | | |
|---|---|---|---|---|
| 3,999,489 A | * | 12/1976 | Kramer | B61D 19/007 105/378 |
| 5,488,911 A | * | 2/1996 | Riggin | B30B 9/3014 105/240 |
| 6,220,178 B1 | * | 4/2001 | Jost | B61D 39/002 105/355 |

* cited by examiner

MOVABLE SIDE WALL AND OPENING/CLOSING MECHANISM FOR RAILROAD BOXCARS

TECHNICAL FIELD

The present invention relates to the technical field of railway freight components, and particularly relates to a movable side wall and opening/closing mechanism for railway boxcars.

BACKGROUND OF THE INVENTION

Railway boxcars, as main tools in railway transportation, play an important role in the railway transportation. With the extensive use of network technology and e-commerce, the production modes and lifestyles of people have undergone dramatic changes, and fast transportation has become more urgent. The openness of the traditional boxcar side wall door is small, so it is suitable for a small-tonnage forklift to enter a carriage to load/unload cargoes, the cargoes can only be loaded from the end portion of the carriage to a car door, and the cargoes can only be unloaded from the car door to the end portion of the carriage, only one forklift is allowed to enter or exit one carriage, such cargo loading and unloading is inefficient, and large cargoes that exceed the size of the car door cannot be loaded.

SUMMARY OF THE INVENTION

The object of the present invention is to provide a movable side wall and opening/closing mechanism for railway boxcars, which can realize the opening of the car door being a half of the length of the side wall and is suitable for a plurality of forklifts of any tonnage to load/unload cargoes to/from any positions of the carriage on the ground, the operation of loading and unloading is convenient, the efficiency is high, and large cargoes with greater sizes can be loaded.

To achieve the above object, a movable side wall and opening/closing mechanism for railway boxcars designed in the present invention includes a side wall assembly, an end portion opening/closing mechanism, a pivot rod assembly, an upper transmission shaft assembly, a lower transmission shaft assembly, an upper track assembly and a lower track assembly, wherein, the side wall assembly includes a side wall, an armrest, an upper abutment assembly, a lower abutment assembly and a pivot rod locking head, the upper abutment assembly and the lower abutment assembly are respectively arranged at upper and lower ends of the side wall, the armrest is arranged at the middle of the side wall, and the pivot rod locking head is arranged at a lower end of the armrest;

the upper abutment assembly includes an upper abutment, an upper roller and a slide rail, and the upper roller is connected with the upper abutment through a round pin and is used for supporting and sliding the side wall; the lower abutment assembly includes a lower abutment and a lower roller, and the lower roller is connected with the lower abutment through a round pin and is used for supporting and sliding the side wall;

the end portion opening/closing mechanism includes a handle assembly, a first connecting rod, a second connecting rod, a third connecting rod, a connecting plate and a gravity block assembly, the handle assembly is fixed to a end wall of a car body and can freely rotate up and down; one end of the first connecting rod is spherically hinged with a lower crank of the lower transmission shaft assembly, and the other end of the first connecting rod is spherically hinged with the handle assembly; the connecting plate is triangular, one end of the second connecting rod is spherically hinged with the handle assembly, and the other end of the second connecting rod is spherically hinged with one side of the connecting plate; one end of the third connecting rod is cylindrically hinged with the other side of the connecting plate, and the other end of the third connecting rod is cylindrically hinged with an upper crank of the upper transmission shaft assembly; the rest side of the connecting plate is hinged with the end wall of a car body; and the gravity block assembly is fixed on the end wall of the car body, and can freely rotate up and down and is used for providing a locking role for the opening and closing states of the handle assembly;

the pivot rod assembly includes a pivot rod, an abutment, a locking head and a handle, and the locking head and the handle are fixedly with the pivot rod; the pivot rod is fixed to a corner column of the end wall through the abutment, and the locking head and the pivot rod locking head can be fastened to lock the side wall assembly;

the upper transmission shaft assembly includes an upper transmission shaft, an upper crank, an upper transmission shaft shifting fork and an upper bearing support, the upper bearing support is fixedly with a top plate of a car body, the upper crank and the upper transmission shaft shifting fork are fixed on the upper transmission shaft, the upper transmission shaft shifting fork is matched with the upper roller, and the side wall assembly is supported and shifted by the upper transmission shaft;

the lower transmission shaft assembly includes a lower transmission shaft, a lower crank, a lower transmission shaft shifting wheel, a lower bearing support and a pre-tightening spring device, and the lower transmission shaft assembly is fixedly with a lower side beam of car body through the lower bearing support; the lower crank and the lower transmission shaft shifting wheel are fixed to the lower transmission shaft, the lower transmission shaft shifting wheel is matched with the lower abutment assembly, and the side wall assembly is supported and shifted by the lower transmission shaft; and the pre-tightening spring device is connected with the lower transmission shaft through a spring, and when the side wall assembly is opening or closing, a rotating torque of the lower transmission shaft can be balanced;

the upper track assembly includes an upper track and an upper hanging seat, the upper track is fixed to a side plate of the top of the car body through the upper hanging seat, a first notch is defined on the upper track at the upper transmission shaft shifting fork, and the side wall assembly sliding to the other side is supported at the first notch by the slide rail on the upper abutment assembly; and the lower track assembly includes a lower track and a lower hanging seat, the lower track is fixed to a side face of a chassis side beam through the lower hanging seat and is used for supporting the opened side wall assembly, a second notch is defined on the lower track at the lower transmission shaft shifting wheel, and the side wall assembly is supported at the second notch by a protection rail of the lower track.

When the handle assembly of the end portion opening/closing mechanism is rotating, the upper transmission shaft and the lower transmission shaft can be driven to rotate by the connecting rods of the end portion opening/closing mechanism, so that the upper transmission shaft shifting fork and the lower transmission shaft shifting wheel drive the side wall assembly to deviate as a whole, such that the upper roller on the side wall assembly drops onto the upper track, and the lower roller on the side wall assembly drops onto the lower track, and then the side wall assembly can slide along the upper track and the lower track.

Further, the movable side wall and opening/closing mechanism of the railway boxcar further includes a side door central pressing device, the side door central pressing device includes a hand wheel and a pressing plate, and the pressing plate is fixed to a middle support of a car body through a round pin, and the side wall assembly can be pressed through rotating the hand wheel.

During cargo loading and unloading of the present invention, the openness of the movable side wall is greater, thereby being suitable for multiple forklifts of any tonnage to load/unload cargoes to/from any positions of the carriage on the ground, and as the pivot rod assembly and the side door central pressing device are provided, the movable side wall has reliable safety and self-locking property in a closed state during transportation, The present invention has the beneficial effects of being simple in structure and convenient to operate, being able to achieve the openness being a half of the side wall of the boxcar, greatly improving the loading and unloading efficiency of the existing boxcars and being able to load large cargoes with greater sizes.

REFERENCE SIGNS

Figure 1:
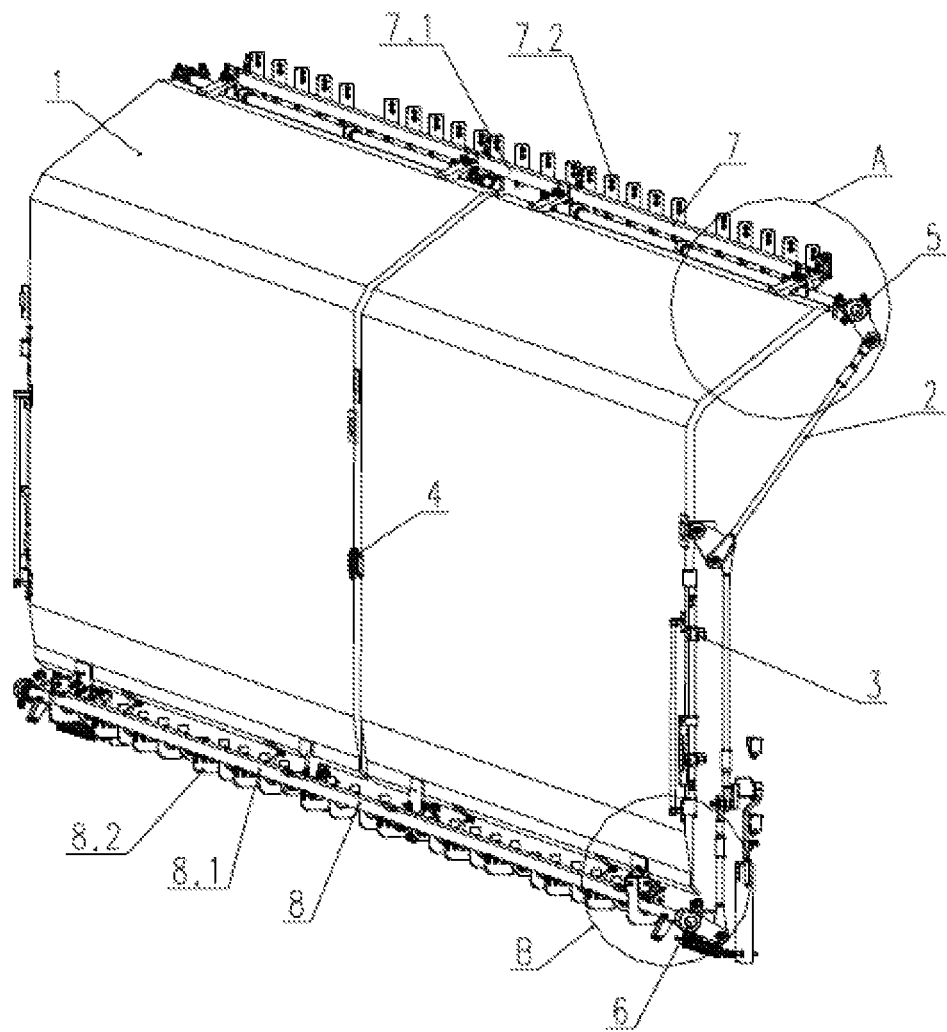
FIG. 1 is a structural schematic diagram of a movable side wall and opening/closing mechanism for railway boxcars.
Figure 2:
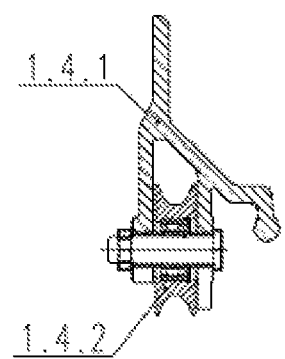
FIG. 2 is a schematic diagram of a sectional structure of a lower abutment in FIG. 1.
Figure 3:
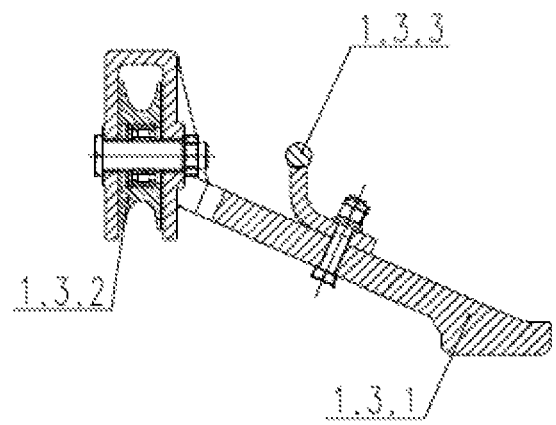
FIG. 3 is a schematic diagram of a sectional structure of an upper abutment in FIG. 1.
Figure 4:
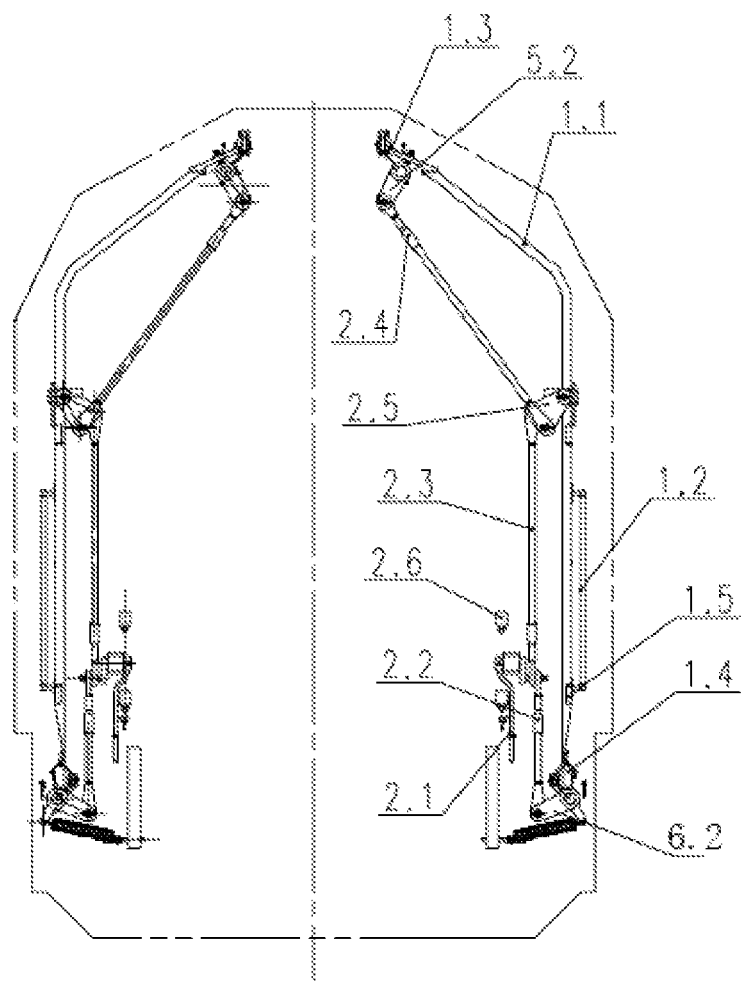
FIG. 4 is a mounting schematic diagram of an end portion opening/closing mechanism in FIG. 1.
Figure 5:
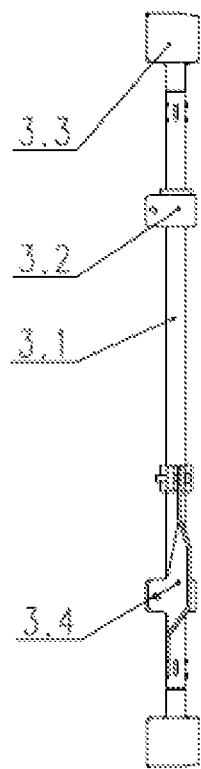
FIG. 5 is a structural schematic diagram of a pivot rod assembly in FIG. 1.
Figure 6:
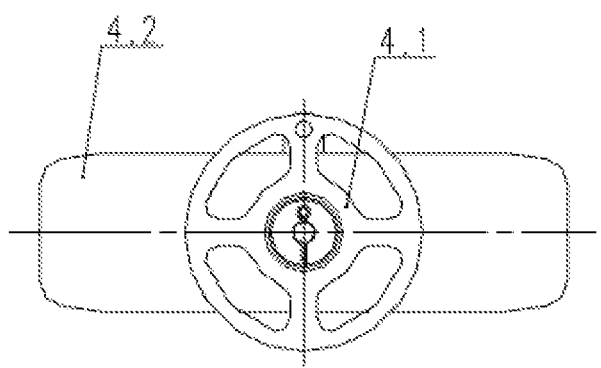
FIG. 6 is a structural schematic diagram of a side door central pressing device in FIG. 1.
Figure 7:
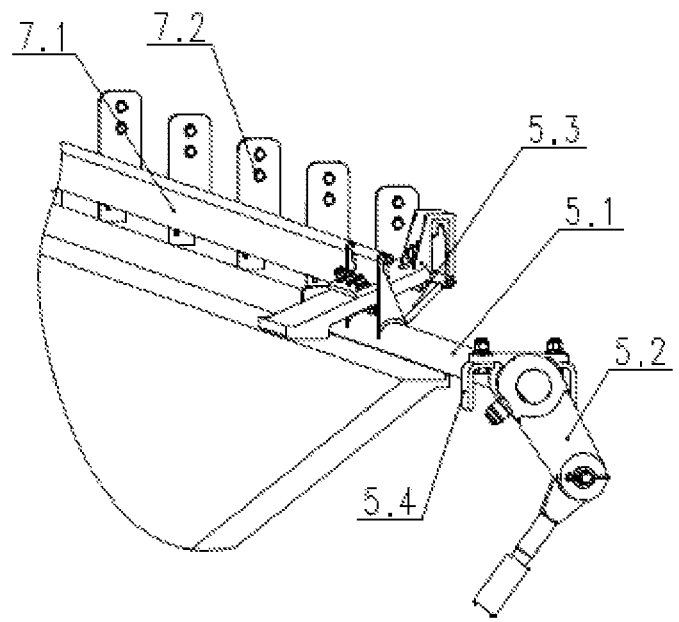
FIG. 7 is a partially enlarged view of A in FIG. 1.
Figure 8:
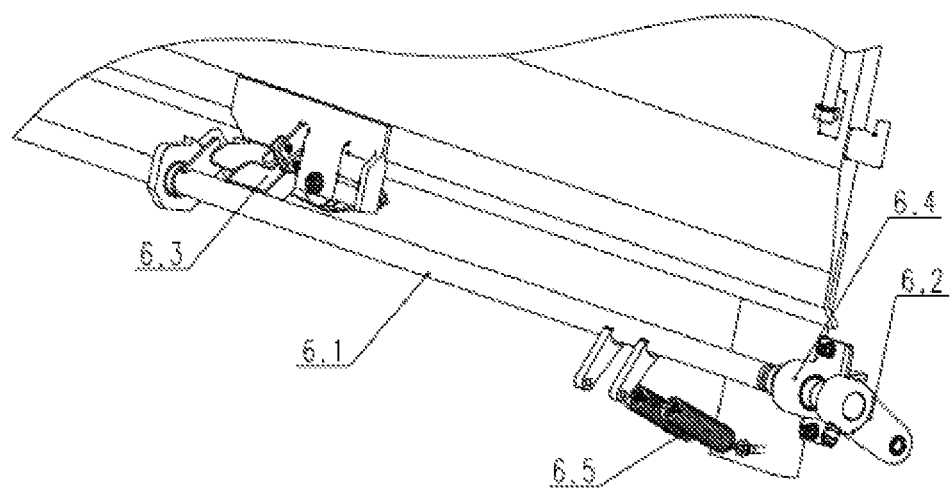
FIG. 8 is a partially enlarged view of B in FIG. 1.

1—side wall assembly, 2—end portion opening/closing mechanism, 3—pivot rod assembly, 4—side door central pressing device, 5—upper transmission shaft assembly, 6—lower transmission shaft assembly, 7—upper track assembly, 8—lower track assembly, 1.1—side wall, 1.2—armrest, 1.3—upper abutment assembly, 1.4—lower abutment assembly, 1.5—pivot rod locking head, 1.3.1—upper abutment, 1.3.2—upper roller, 1.3.3—slide rail, 1.4.1—lower abutment, 1.1.2—lower roller, 2.1—handle assembly, 2.2—first connecting rod, 2.3—second connecting rod, 2.4—third connecting rod, 2.5—connecting plate, 2.6—gravity block assembly, 3.1—pivot rod, 3.2—abutment, 3.3—locking head, 3.4—handle, 4.1—hand wheel, 4.2—pressing plate, 5.1—upper transmission shaft, 5.2—upper crank, 5.3—upper transmission shaft shifting fork, 5.4—upper bearing support, 6.1—lower transmission shaft, 6.2—lower handle, 6.3—lower transmission shaft shifting wheel, 6.4—lower bearing support, 6.5—pre-tightening spring device, 7.1—upper rail, 7.2—upper hanging seat, 8.1—lower rail and 8.2—lower hanging seat.

DETAILED DESCRIPTION OF THE INVENTION

The present invention will be further described below in detail with reference to the drawings and specific embodiments:

A movable side wall and opening/closing mechanism for railway boxcars as shown in the figure includes a side wall assembly 1, an end portion opening/closing mechanism 2, a pivot rod assembly 3, a side door central pressing device 4, an upper transmission shaft assembly 5, a lower transmission shaft assembly 6, an upper track assembly 7 and a lower track assembly 8, wherein:

the side wall assembly 1 includes a side wall 1.1, an armrest 1.2, an upper abutment assembly 1.3, a lower abutment assembly 1.4 and a pivot rod locking head 1.5, the upper abutment assembly 1.3 and the lower abutment assembly 1.4 are respectively arranged at upper and lower ends of the side wall 1.1, the armrest 1.2 is arranged at the middle of the side wall 1.1, and the pivot rod locking head 1.5 is arranged at a lower end of the armrest 1.2;

the upper abutment assembly 1.3 includes an upper abutment 1.3.1, an upper roller 1.3.2 and a slide rail 1.3.3, and the upper roller 1.3.2 is connected with the upper abutment 1.3.1 through a round pin and is used for supporting and sliding the side wall 1.1; the lower abutment assembly 1.4 includes a lower abutment 1.4.1 and a lower roller 1.4.2, and the lower roller 1.4.2 is connected with the lower abutment 1.4.1 through a round pin and is used for supporting and sliding the side wall 1.1;

the end portion opening/closing mechanism 2 includes a handle assembly 2.1, a first connecting rod 2.2, a second connecting rod 2.3, a third connecting rod 2.4, a connecting plate 2.5 and a gravity block assembly 2.6, the handle assembly 2.1 is fixed to a end wall 10 of a car body and can freely rotate up and down; one end of the first connecting rod 2.2 is spherically hinged with a lower crank 6.2 of the lower transmission shaft assembly 6, and the other end of the first connecting rod is spherically hinged with the handle assembly 2.1; the connecting plate 2.5 is triangular, one end of the second connecting rod 2.3 is spherically hinged with the handle assembly 2.1, and the other end of the second connecting rod is spherically hinged with one side of the connecting plate 2.5; one end of the third connecting rod 2.4 is cylindrically hinged with the other side of the connecting plate 2.5, and the other end of the third connecting rod is cylindrically hinged with an upper crank 5.2 of the upper transmission shaft assembly 5; the rest side of the connecting plate 2.5 is hinged with the end wall of car body; and the gravity block assembly 2.6 is fixed on the end wall of car body, and can freely rotate up and down, and is used for providing a locking role for the opening and closing states of the handle assembly 2.1;

the pivot rod assembly 3 includes a pivot rod 3.1, a abutment 3.2, a locking head 3.3 and a handle 3.4, and the locking head 3.3 and the handle 3.4 is fixedly with the pivot rod 3.1; the pivot rod 3.1 is fixed to a corner column of the end wall through the abutment 3.2, and the locking head 3.3 and the pivot rod locking head 1.5 can be fastened to lock the side wall assembly 1;

the side door central pressing device 4 includes a hand wheel 4.1 and a pressing plate 4.2, and the pressing plate 4.2 is fixed to a middle support of a car body through a round pin, and when the hand wheel 4.1 is rotated, the side wall assembly 1 can be pressed;

the upper transmission shaft assembly 5 includes an upper transmission shaft 5.1, an upper crank 5.2, an upper transmission shaft shifting fork 5.3 and an upper bearing support 5.4, the upper bearing support 5.4 is fixedly with a top plate of a car body, the upper crank 5.2 and the upper transmission shaft shifting fork 5.3 are fixed on the upper transmission shaft 5.1, the upper transmission shaft shifting fork 5.3 is matched with the upper roller 1.3.2, and the side wall assembly 1 is supported and shifted by the upper transmission shaft 5.1;

the lower transmission shaft assembly 6 includes a lower transmission shaft 6.1, a lower crank 6.2, a lower transmission shaft shifting wheel 6.3, a lower bearing support 6.4 and a pre-tightening spring device 6.5, and the lower transmission shaft assembly 6 is fixedly with a lower side beam of a car body through the lower bearing support 6.4; the lower crank 6.2 and the lower transmission shaft shifting wheel 6.3 are fixed to the lower transmission shaft 6.1, the lower transmission shaft shifting wheel 6.3 is matched with the lower abutment assembly 1.4, and supports and shifts the side wall assembly 1 through the lower transmission shaft 6.1; and the pre-tightening spring device 6.5 is connected with the lower transmission shaft 6.1 through a spring, and when the side wall assembly 1 is opening or closing, a rotating torque of the lower transmission shaft 6.1 can be balanced;

the upper track assembly 7 includes an upper track 7.1 and an upper hanging seat 7.2, the upper track 7.1 is fixed to a side plate of the top of the car body through the upper hanging seat 7.2, a first notch is defined on the upper track 7.1 at the upper transmission shaft shifting fork 5.3, and the side wall assembly 1 sliding to the other side is supported at the first notch by the slide rail 1.3.3 on the upper abutment assembly 1.3; and the lower track assembly 8 includes a lower track 8.1 and a lower hanging seat 8.2, the lower track 8.1 is fixed to a side face of a chassis side beam through the lower hanging seat 8.2 and is used for supporting the opened side wall assembly 1, a second notch is defined on the lower track 8.1 at the lower transmission shaft shifting wheel 6.3, and the side wall assembly 1 is supported at the second notch by a protection rail of the lower track 8.1.

When the handle assembly 2.1 of the end portion opening/closing mechanism 2 is rotating, the upper transmission shaft 5.1 and the lower transmission shaft 6.1 can be driven to rotate by the connecting rods of the end portion opening/closing mechanism 2, so that the upper transmission shaft shifting fork 5.3 and the lower transmission shaft shifting wheel 6.3 drive the side wall assembly 1 to deviate as a the whole, such that the upper roller 1.3.2 on the side wall assembly 1 drops onto the upper track 7.1, and the lower roller 1.1.2 on the side wall assembly 1 drops onto the lower track 8.1, and then the side wall assembly 1 can slide along the upper track 7.1 and the lower track 8.1.

During cargo loading and unloading of the embodiments of the present invention, the openness of the movable side wall assembly 1 is greater, thereby being suitable for multiple forklifts of any tonnage to load/unload cargoes to/from any positions of the carriage on the ground, and as the pivot rod assembly 3 and the side door central pressing device 4 are provided, the movable side wall assembly 1 has reliable safety and self-locking property in a closed state during transportation.

What is claimed is:

1. A railroad boxcar with a movable side wall, comprising:
   a side wall assembly (1) comprising a side wall (1.1), an upper abutment assembly (1.3) configured to support and slide the side wall (1.1) and a lower abutment assembly (1.4) configured to support and slide the side wall (1.1), wherein the upper abutment assembly (1.3) further comprises an upper abutment (1.3.1), an upper roller (1.3.2) and a slide rail (1.3.3), the lower abutment assembly (1.4) further comprises a lower abutment (1.4.1) and a lower roller (1.4.2);
   an end portion opening/closing mechanism (2) comprising a handle assembly (2.1) being fixed to an end wall of the railroad boxcar and being capable of freely rotate up and down for the opening and closing states of the handle assembly (2.1);
   a pivot rod assembly (3) configured to lock the side wall assembly (1);
   an upper transmission shaft assembly (5) configured to support and shift the side wall assembly (1), the upper transmission shaft assembly (5) comprising: an upper transmission shaft (5.1) and an upper transmission shaft shifting fork (5.3) configured to match with the upper roller (1.3.2);
   a lower transmission shaft assembly (6) configured to support and shift the side wall assembly (1), the lower transmission shaft assembly (6) comprising a lower transmission shaft (6.1) and a lower transmission shaft shifting wheel (6.3);
   an upper track assembly (7) comprising an upper track (7.1);
   a lower track assembly (8) comprising a lower track (8.1), and
   a side door central pressing device (4),
   wherein a rotation of the handle assembly (2.1) of the end portion opening/closing mechanism (2) is configured to
   drive upper transmission shaft (5.1) and the lower transmission shaft (6.1) to rotate by the connecting rods of the end portion opening/closing mechanism (2);
   drive, by the upper transmission shaft shifting fork (5.3) and the lower transmission shaft shifting wheel (6.3), the side wall assembly (1) to deviate as a whole through:
   dropping the upper roller (1.3.2) on the side wall assembly (1) onto the upper track (7.1), and the lower roller (1.4.2) on the side wall assembly (1) onto the lower track (8.1); and
   enabling the side wall assembly (1) to slide along the upper track (7.1) and the lower track (8.1).

2. The railroad boxcar with a movable side wall according to claim 1, wherein the side door central pressing device (4) comprises a hand wheel (4.1) and a pressing plate (4.2), and the pressing plate (4.2) is fixed to a middle support of the car body through a round pin, and the side wall assembly (1) can be pressed through rotating the hand wheel (4.1).

* * * * *